April 16, 1957   W. E. BLAIN   2,788,526
TOILET FLUSH VALVE
Filed March 12, 1954

INVENTOR.
Willard E. Blain

United States Patent Office 2,788,526
Patented Apr. 16, 1957

2,788,526

TOILET FLUSH VALVE

Willard E. Blain, Miami, Okla.

Application March 12, 1954, Serial No. 415,823

1 Claim. (Cl. 4—57)

This invention relates to flush valves for flush tanks as used with toilet bowls or similar devices.

An object of this invention is to provide a flush valve assembly which can be readily attached to flush valve seats and which will provide a simple positive-acting-off valve.

A further object of this invention is to provide a flush valve assembly including a free valve member, a cage for retaining the member in which the cage is constructed of relatively simple members which can be easily assembled and with which the cage can be readily secured to flush valve seats having varied construction and dimensions.

Still another object of my invention is to provide a valve-operating mechanism of simple design, yet which will positively act to operate the valve member. A still further object of my invention is to provide a flush valve assembly which can be connected with the operating mechanism of all types of flush boxes.

Presently constructed valves and cooperating mechanism employed in flush tanks are not entirely satisfactory. Often the valves do not seat properly, permitting leakage and waste of water. Furthermore, it is necessary to adjust guides and other mechanism on frequent occasions. It is usually quite difficult for the average person to properly adjust the valve mechanism. With a valve mechanism constructed in accordance with my invention mis-alignment of the valve with the seat will never occur, and it will not be necessary to adjust the mechanism.

These and other objects and advantages will become apparent from the following description and the accompanying drawings in which.

Similar reference characteristics in the several views indicate similar parts.

Figure 3:
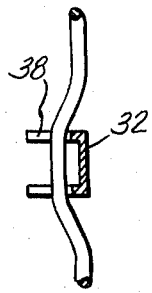
Figure 3 is a fragmentary elevational view showing a spring finger member positioned in a ring-like enclosure forming part of the invention.

Referring now in particular to the drawings, reference character 10 indicates a ball valve. The valve can be formed as a hollow sphere and made of rubber, plastic or any other material having some resilience. The interior of the ball is preferably hollow, and is filled with a gas, such as air. The ball may also be filled with a lighter than air gas, in order to increase the buoyancy.

The ball is shown to be enclosed within a cage 12. The latter is formed of a number of finger-like members 14. The finger members are made of resilient material such as stainless steel and comprise vertical sections 16 upper curve sections 18 bight portions 20 and reversely curved sections 22. The upper curved portions are connected to ring 24 by welding or any other suitable means. Ring 24 has a central aperture 26. The reversely curved portions 22 include an inwardly extending leg 28 connected to a downwardly and outwardly projecting leg 30, thus forming a detent.

Figure 2:
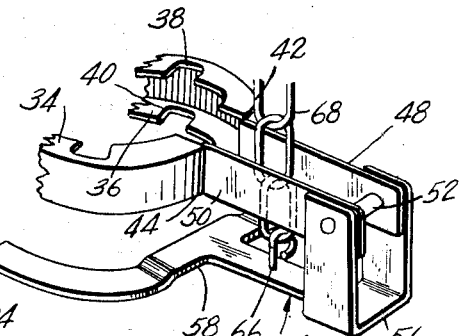
Figure 2 is a perspective view of a portion of the device shown in Figure 1.

The flush valve assembly further includes a cylindrical ring 32, which is channel-shaped as shown in Figure 2. The ring has upper and lower flanges 34 and 36, respectively. Both flanges have aligned recesses 38 and 40 at spaced points. Each of the fingers 14 are received in a pair of aligned recesses and held therein by tension of the spring finger as seen in Figure 3.

Figure 1:
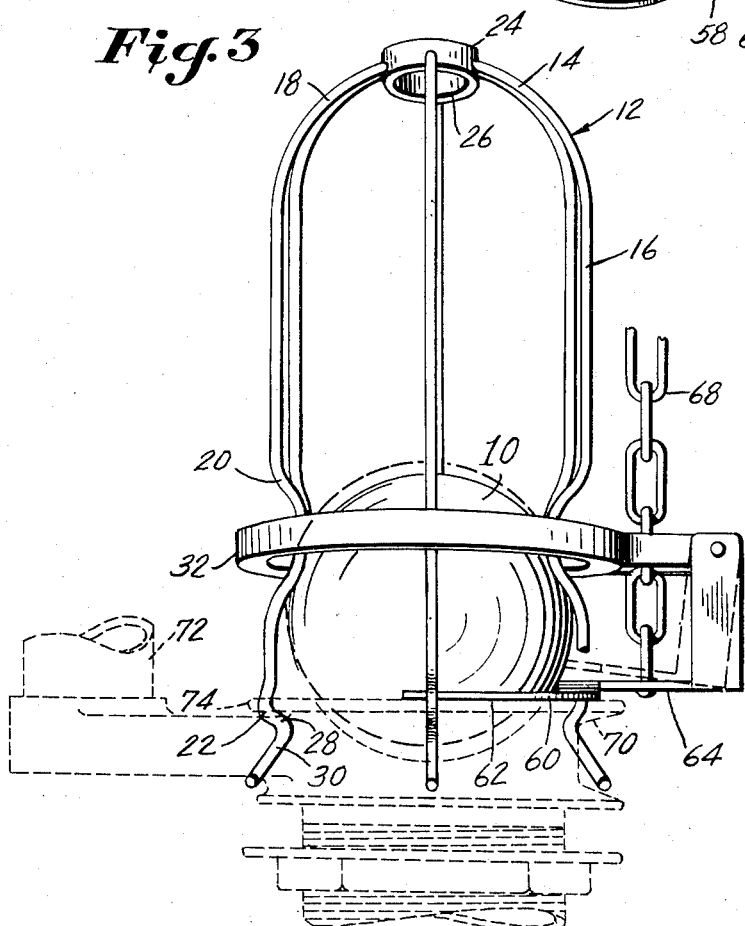
Figure 1 is an elevational perspective view of a valve assembly constructed in accordance with the invention, showing the assembly as mounted on a flush valve seat.

Ring 32 is a split to provide two ends, 42 and 44. Spaced parallel flanges 48 and 50 are secured to ends 42 and 44, respectively, and extend laterally outward from the ring. The flanges support shaft or pin 52. Valve-operator 54 is pivotally connected to pin 52 by means of the U-shaped section 56 connected to one end of the valve operator. At its opposite end the valve operator has circular arc-shaped elements 58. The latter includes downwardly extending portions 60 connected to horizontally extending portions 62. The central leg 64 is adapted to normally extend substantially horizontally parallel to ring 32 when positioned on a valve seat as shown in Figure 1, with the arc-shaped elements also substantially parallel to the ring. Hook 66 is connected to the central leg 64 and is adapted to be secured to the usual chain 68. The latter is normally connected to an operating handle of a flush box for example.

Figure 1 shows the invention mounted on the flush box valve seat. The valve seat 70 is usually formed integral with the overflow pipe 72 and has a lip 74. The spring fingers are adapted to resiliently receive lip 74 within the detents described above. The resiliency of the spring fingers, coupled with the restraining effect of ring 32, causes the fingers to securely grip the valve seat member. Member 62 is formed so as to lie closely adjacent the perimeter of the ball valve.

When the chain 68 is pulled upwardly the ball will be raised from the seat and float to the top of the cage. When this occurs, of course, the water will flow out of the flush box. As the water recedes, the ball will move downwardly towards the valve seat until it reaches a point slightly above its closed position. At the latter point, due to the reduced pressure below the ball, it will seat with a snap-like action. The ball is self-centered. It will always correctly seat on the valve seat, and it is obvious that no adjustments will be necessary.

While I have shown and described a preferred form of my invention, it will be obvious that many changes in detail and form can be made within the scope of the appended claim.

I claim:

A flush box valve assembly comprising a series of spring finger elements having vertically extending parallel portions, upper curved portions connected to a common central ring-like member and forming a cage, said spring fingers having bight portions formed in the vertical sections thereof and detents formed by reversed curving of said spring finger members adjacent the lower ends with their lower ends being free, a ring-like enclosure surrounding said spring fingers and receiving said bight portions in spaced recesses formed in said ring-like member, said ring-like member being split to form opposed ends, spaced flanges projecting laterally from said opposed ends of said ring, a pin supported in said flanges, a valve-operating member having a U-shaped section pivotally connected to said pin, and a central leg adapted to extend substantially horizontally parallel to said ring-like member, said valve operator having arc-shaped members formed at one end thereof and each including a horizontally extending portion and an upwardly curved portion, connected to said central leg, and a sphere formed of resilient material freely received within the said cage and freely movable therein, said sphere and said arc-shaped members being dimensioned, so that the inner edges of said arc-shaped members lie closely adjacent the perimeter of said ball.

References Cited in the file of this patent

UNITED STATES PATENTS

| | | |
|---|---|---|
| 592,810 | Mitchell | Nov. 2, 1897 |
| 1,538,656 | Richardson | May 19, 1925 |
| 1,799,770 | Wegner | Apr. 7, 1931 |
| 2,613,366 | Walter | Oct. 14, 1952 |
| 2,650,369 | Alliss | Sept. 1, 1953 |